United States Patent
Stallinga et al.

(10) Patent No.: US 7,385,888 B2
(45) Date of Patent: Jun. 10, 2008

(54) TRACKING SYSTEM WITH DUAL DIFFERENTIAL SIGNALS WITH FRACTION OF A/C SIGNAL ADDED BACK TO D/C SIGNAL

(75) Inventors: Sjoerd Stallinga, Eindhoven (NL); Maarten Kuijper, Dordrecht (NL); Aalbert Stek, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 610 days.

(21) Appl. No.: 10/525,135

(22) PCT Filed: Aug. 5, 2003

(86) PCT No.: PCT/IB03/03363

§ 371 (c)(1),
(2), (4) Date: Feb. 16, 2005

(87) PCT Pub. No.: WO2004/019332

PCT Pub. Date: Mar. 4, 2004

(65) Prior Publication Data

US 2005/0265153 A1    Dec. 1, 2005

(30) Foreign Application Priority Data

Aug. 21, 2002   (EP)   .................. 02292072

(51) Int. Cl.
*G11B 7/007* (2006.01)

(52) U.S. Cl. .................................................. 369/44.41
(58) Field of Classification Search ............. 369/44.41
See application file for complete search history.

(56) References Cited

U.S. PATENT DOCUMENTS

| | | | | |
|---|---|---|---|---|
| 5,130,963 | A * | 7/1992 | Kusano et al. ........... | 369/44.28 |
| 5,282,192 | A * | 1/1994 | Yamada et al. .......... | 369/275.4 |
| 5,448,551 | A * | 9/1995 | Miyagawa et al. ...... | 369/275.1 |
| 5,616,390 | A * | 4/1997 | Miyagawa et al. ....... | 428/64.1 |
| 7,170,837 | B2 * | 1/2007 | Mashimo ................. | 369/53.26 |

* cited by examiner

*Primary Examiner*—Gautam R. Patel

(57) ABSTRACT

Tracking system for guiding an optical beam on tracks on an optical disc, said tracking system comprising a photodetector (A1, A2) for detecting optical beams derived from said optical beam, said photodetector generating a first output signal (A) and a second output signal (B), said tracking system comprising first processing means for generating a first differential signal (PP(DC)) corresponding to the low-frequency part of a difference between said first and second output signals. The tracking system comprises second processing means for generating a tracking error signal (PP(AC/DC)) defined by the addition of said first differential signal (PP(DC)) to a second differential signal (PP'(AC)), said second differential signal corresponding to a fraction of the difference in amplitude of the high-frequency components of said first and second output signals. Use: Optical disc player/writer.

6 Claims, 4 Drawing Sheets

TRACKING SYSTEM WITH DUAL DIFFERENTIAL SIGNALS WITH FRACTION OF A/C SIGNAL ADDED BACK TO D/C SIGNAL

FIELD OF THE INVENTION

The invention relates to a tracking system for guiding an optical beam on tracks on an optical disc, said tracking system comprising a photodetector for detecting optical beams derived from said optical beam, said photodetector generating a first output signal and a second output signal, said tracking system comprising first processing means for generating a first differential signal corresponding to the low-frequency part of a difference between said first and second output signals.

The invention may be used in the field of optical recording.

BACKGROUND OF THE INVENTION

A method of maintaining a spot on tracks of an optical disc is known as DC push-pull method. This method involves the generation of a tracking error signal referred to as push-pull signal. Said tracking error signal corresponds to the default error signal in the radial axis of the disc and is caused by the interaction of the spot with the groove or some other tracking structure placed on the disc surface. A tracking servo adjusts the radial position of the spot to keep the push-pull signal at a predetermined value. Generally, the spot is on the track for the zero-crossing points of the push-pull signal.

FIG. 1 depicts the implementation of the known DC push-pull method. It includes a photodetector comprising two areas A1 and A2 for detecting reflected or transmitted beams of the optical spot. This photodetector generates two output signals A and B that are filtered by low-pass filters LPF1 and LPF2, resulting in low-frequency signals A(DC) and B(DC). Subtracting means SUB1 determine the difference of the signals A(DC) and B(DC) for the purpose of generating the low-frequency push-pull signal PP(DC) that is used as a tracking error signal.

This prior art method is subject to limitations.

Due to the change in average reflectivity of the tracks, the amplitude of the push-pull signal on written tracks differs from the amplitude on unwritten tracks (i.e. empty tracks). As a consequence, the slope of the push-pull signal at the zero-crossing points varies. Moreover, offsets in the zero-crossings area may also occur at the transition between written and unwritten tracks. Thus, this method allows the generation of a distorted push-pull signal which introduces instabilities in the control loop of the radial tracking.

Since the zero-crossing points are not precisely identified in the DC push-pull signal, some zero-crossings may also not be taken into account in a displacement from a first radial position to a second radial position. In other words, this method leads to missing tracks in radial displacements.

OBJECT AND SUMMARY OF THE INVENTION

It is an object of the invention to propose a tracking system in which the radial tracking on an optical disc is improved.

To this end, the method according to the invention is characterized in that the tracking system comprises second processing means for generating a tracking error signal defined by the addition of said first differential signal to a second differential signal, said second differential signal corresponding to a fraction of the difference in amplitude of the high-frequency components of said first and second output signals.

The invention consists in adding a fraction of a high-frequency push-pull signal PP(AC) to the push-pull signal PP(DC) for generating a tracking error signal used for radial tracking.

The variations in amplitude of the push-pull signal PP(DC) are compensated when the optical beam is displaced between written and unwritten areas of the disc. The shape of the tracking error signal is then close to a sine wave whatever the displacement from a written to an unwritten area, or from an unwritten to a written area. As a consequence, the zero-crossings of this tracking error signal, used for detecting the center of the tracks (or the center between two tracks), are precisely identified because they have substantially all the same offset and slope.

Because of the improvement of the radial tracking in using the invention, the performance of optical reading and writing processes is improved even with optical discs deviating from the norm, for example when the chemical composition of the recordable or rewritable layer of the disc is varying. In particular, the number of missed tracks is reduced.

This tracking system is implemented by cost-effective processing means either in digital or analog technology, which facilitates its integration in consumer products such as optical disc players.

This method can be used either with the single-spot push-pull method or with the three-spot push-pull method, which means that it can be implemented in most existing optical disc players.

In a preferred embodiment, the tracking system according to the invention is characterized in that it comprises adjusting means for adjusting the value of said fraction to a value which minimizes a merit function, said merit function being a function of a first parameter and a second parameter, said first parameter corresponding to the ratio between the amplitude of said first differential signal in an area with only unwritten tracks and the amplitude of said first differential signal in an area with only written tracks, said second parameter corresponding to the difference in amplitude of said first differential signal between two adjacent tracks of which one is written and the other is unwritten.

This characteristic allows to adapt and optimize the performance of the tracking system for the disc type and to the disc characteristics.

It is also an object of the invention to propose a method of tracking in which the radial tracking on an optical disc is improved.

This method of tracking comprises a photodetection step for detecting reflected or transmitted optical beams derived from said optical beam, said photodetection step generating a first output signal and a second output signal, said method comprising a first processing step for generating a first differential signal corresponding to the low-frequency part of a difference between said first and second output signals.

The method of tracking according to the invention is characterized in that it comprises a second processing step for generating a tracking error signal defined by the addition of said first differential signal to a second differential signal, said second differential signal corresponding to a fraction of the difference in amplitude of the high-frequency components of said first and second output signals.

In a preferred mode, the method of tracking according to the invention is characterized in that it comprises an adjusting step for adjusting the value of said fraction to a value which minimizes a merit function, said merit function being a function of a first parameter and a second parameter, said first parameter corresponding to the ratio between the amplitude of said first differential signal in an area with only unwritten tracks and the amplitude of said first differential signal in an area with only written tracks, said second parameter corresponding to the difference in amplitude of said first differential signal between two adjacent tracks of which one is written and the other is unwritten.

The invention also relates to an apparatus for reading and/or writing an optical disc, said apparatus comprising a tracking system as described above.

Detailed explanations and other aspects of the invention will be given below.

BRIEF DESCRIPTION OF THE DRAWINGS

The particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

Figure 1:
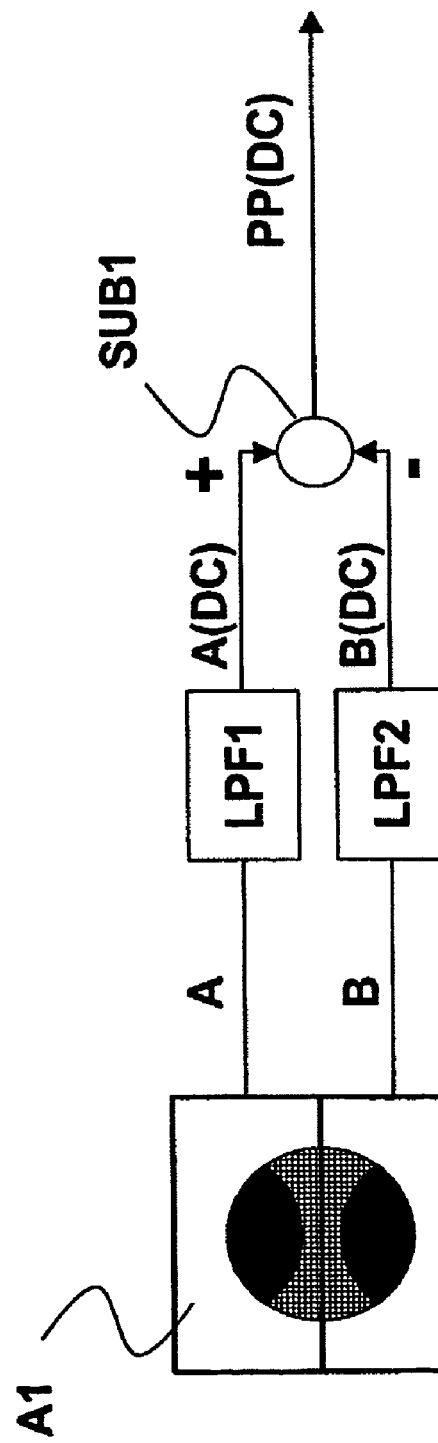
FIG. 1 depicts a known tracking system for generating a radial tracking error signal.
Figure 2:
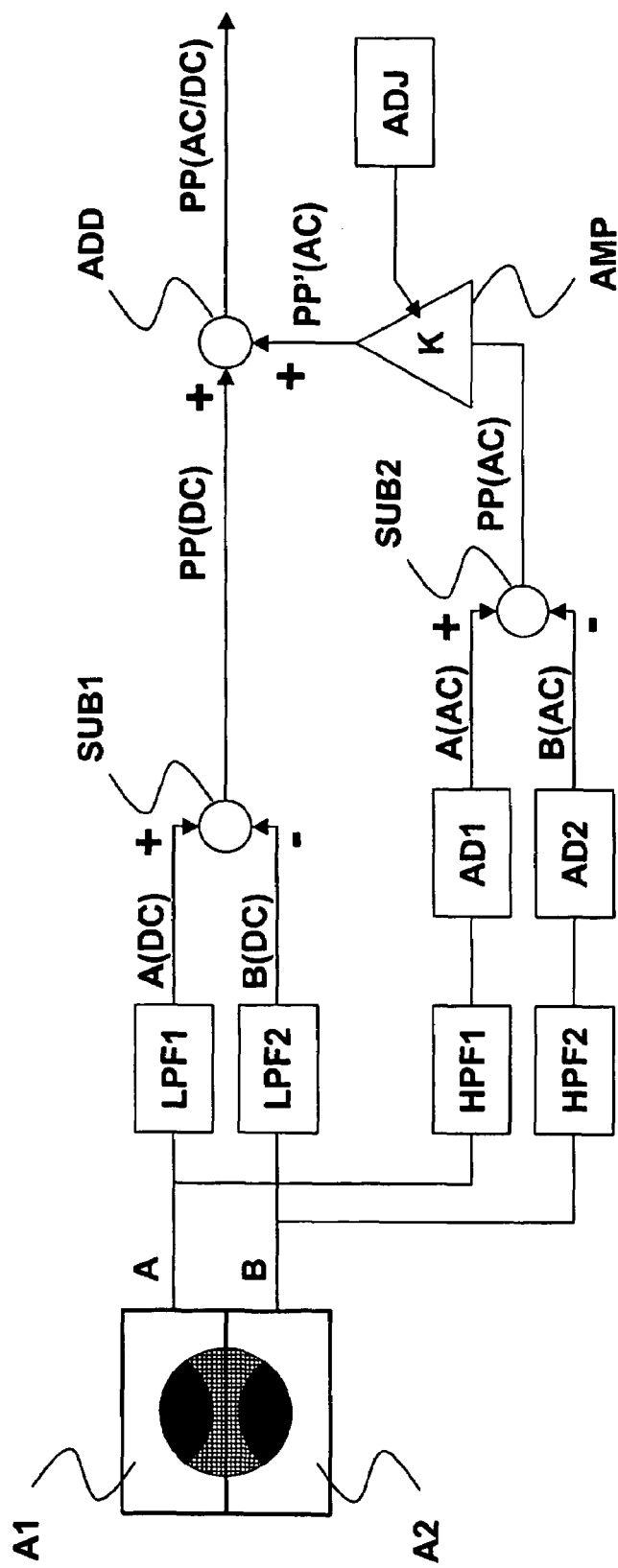
FIG. 2 depicts a tracking system according to the invention for generating a radial tracking error signal.

FIG. 2 depicts a tracking system according to the invention for generating a radial tracking error signal.

The tracking system includes a photodetector comprising two areas A1 and A2 for detecting reflected beams of the optical spot. This photodetector generates two output signals A and B.

For generating an improved tracking error signal PP(AC/DC), the invention uses the high-frequency content of the output signals A and B. High-frequency components are caused by the presence of short marks on the optical disc, said marks having different reflectivity factors depending on the recorded digital data. The high-frequency content is present for written tracks/areas and null for unwritten tracks/areas.

For written tracks, the amplitude signals A(AC) and B(AC) of the high-frequency signals of the two detector halves vary sinusoidally with track position, as does the low-frequency part used for the DC push-pull signal PP(DC). These sinusoidal variations of the two halves are not in phase, meaning that the difference between the amplitudes of signals A(AC) and B(AC), said differential signal being referred to as AC push-pull signal PP(AC), also varies sinusoidally with track position. For symmetry reasons, this differential signal is zero when the spot is on the tracks (or halfway between the tracks).

The tracking system comprises first processing means for generating a first differential signal PP(DC) corresponding to the low-frequency part of a difference between said first output signal A and said second output signal B. Said first processing means comprise:

a first low-pass filter LPF1 for generating a low-frequency signal A(DC) from signal A, the cut-off frequency of the low-pass filter LPF1 being typically in the range of 10-100 kHz, a second low-pass filter LPF2 for generating a low-frequency signal B(DC) from signal B, the cut-off frequency of the low-pass filters LPF2 being typically in the range of 10-100 kHz, subtracting means SUB1 for subtracting signals A(DC) and B(DC) and for generating said DC push-pull signal PP(DC).

The tracking system also comprises second processing means for generating a tracking error signal PP(AC/DC) defined by the addition of said DC push-pull signal PP(DC) to a second differential signal PP'(AC). Said second processing means comprise:

a first high-pass filter HPF1 for generating a first high-frequency signal from signal A, a second high-pass filter HPF2 for generating a second high-frequency signal from signal B, amplitude detection means AD1 for detecting the amplitude A(AC) of said first high-frequency signal, amplitude detection means AD2 for detecting the amplitude B(AC) of said second high-frequency signal, subtracting means SUB2 for subtracting signals A(AC) and B(AC) and for generating said AC push-pull signal PP(AC), amplification means AMP for amplifying the AC push-pull signal PP(AC) by a gain factor K, and for generating said second differential signal PP'(AC), adding means ADD for adding the DC push-pull signal PP(DC) to said second differential signal PP'(AC) and for generating said tracking error signal PP(AC/DC).

The tracking error signal PP(AC/DC) can thus be expressed by:

$$PP(AC/DC)=PP(DC)+PP'(AC) \quad \text{Eq.1}$$

$$PP(AC/DC)=PP(DC)+K*PP(AC) \quad \text{Eq.2}$$

$$PP(AC/DC)=A(DC)-B(DC)+K*[A(AC)-B(AC)] \quad \text{Eq.3}$$

The cut-off frequency of high-pass filters HPF1 and HPF2 is preferably situated between the wobble frequency of the optical disc (if a wobble is present) and the frequency corresponding to a multiple D of the clock frequency, the wobble frequency being derived from the spiral pre-groove structure of the optical disc, the clock frequency being a parameter defined by the optical reading/writing standards such as the DVD standard. The digital data written on optical discs being represented by marks of varying length, the length of the marks and of the spaces between the marks are converted into an integral number of times the clock cycle length. Dealing with a run-length-limited (RLL)-coding of the data, this integral number can take the values d+1, d+2, . . . , k+1. For example, if data are coded by the EFM-coding method used in Compact Disc, d=2 and k=10. If data are coded by the 17PP coding method (17PP standing for "17 Parity Preserve" described in the new Blu-ray Disc standard), d=1 and k=7.

The frequency content of the data corresponds to periods of typically 2(k+1) times the clock cycle length to 2(d+1) times the clock cycle length. The multiple D is then chosen such that D=2*(d+1), so that the cut-off frequency is below the main frequency components of the data.

Figure 4:
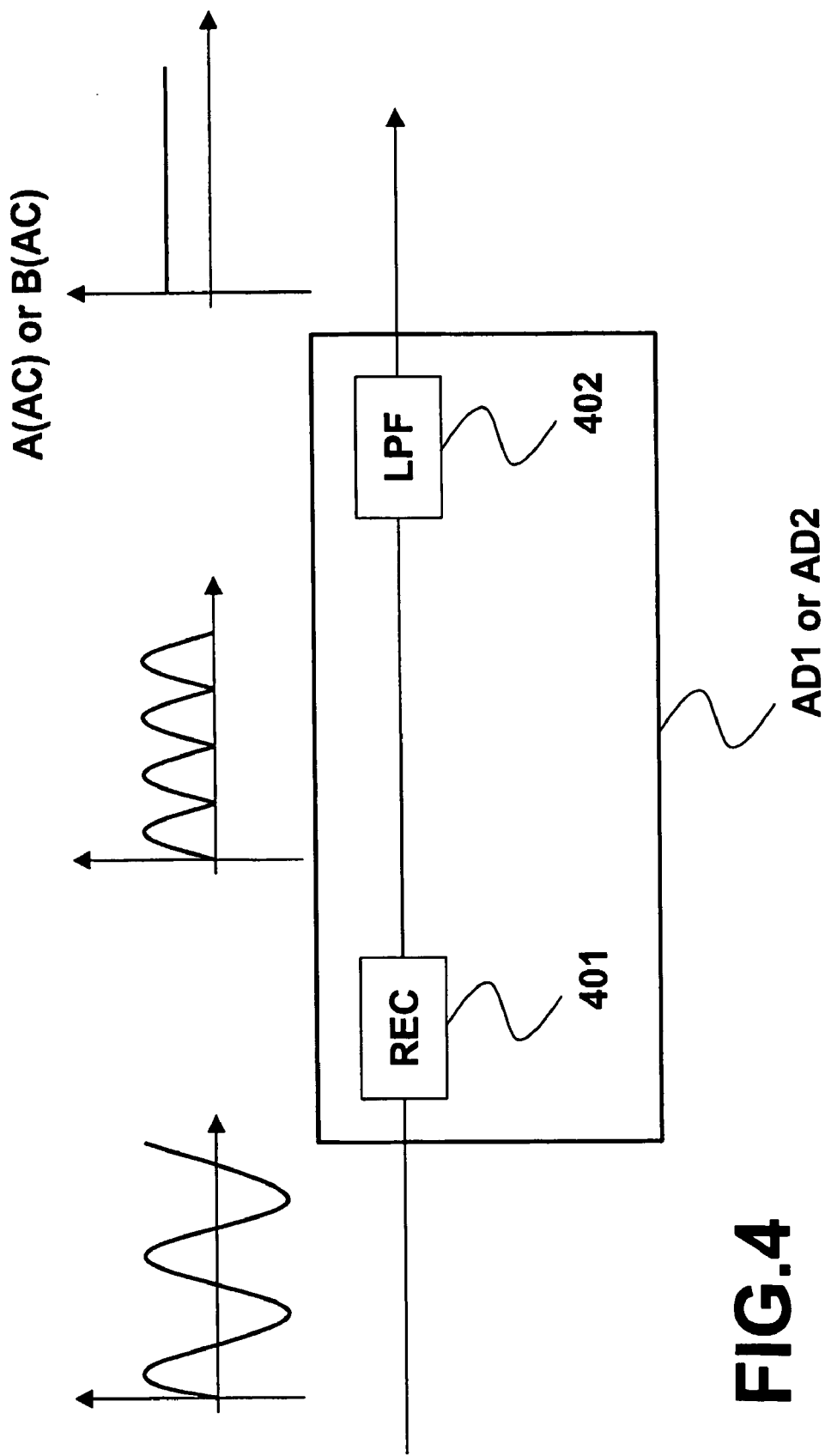
FIG. 4 depicts an arrangement for performing an amplitude detection according to the invention.

For detecting the amplitude, amplitude detection means AP1 and AP2 may comprise a rectifier 401 followed by a low-pass filter 402, as shown in FIG. 4.

In a preferred embodiment, the tracking system comprises normalization means (not shown In FIG. 2) for normalizing the tracking error signal PP(AC/DC). Three normalizations can be envisaged for normalizing the tracking error signal PP(AC/DC):

Normalization 1:

$$PP(AC/DC) = \frac{A(DC) - B(DC) + K^*(A(AC) - B(AC))}{A(AC) + B(AC)} \quad \text{Eq. 4}$$

Normalization 2:

$$PP(AC/DC) = \frac{A(DC) - B(DC)}{A(DC) + B(DC)} + K^* \frac{A(AC) - B(AC)}{A(AC) + B(AC)} \quad \text{Eq. 5}$$

Normalization 3:

$$PP(AC/DC) = \frac{A(DC) - B(DC) + K^*(A(AC) - B(AC))}{A(DC) + B(DC) + |K|^*(A(AC) + B(AC))} \quad \text{Eq. 6}$$

The normalisation of the tracking error signal is performed for accommodating variations in the overall intensity of the light source or the average disc reflectivity.

In a preferred embodiment, the tracking system comprises adjusting means ADJ for adjusting the value of the gain factor K.

Let push-pull ratio R be the ratio between the DC-push-pull amplitude in an area with only unwritten tracks and the DC-push-pull amplitude in an area with only written tracks.

Let push-pull variation V be the difference in DC push-pull amplitude between two adjacent tracks of which one is written and the other unwritten.

Theoretically, the push-pull variation V increases linearly with the push-pull ratio R. Moreover, if the push-pull variation V=0, the push-pull ratio R=1. In this ideal case the method according to the invention eliminates both the deviation of the push-pull ratio R from R=1 and the deviation of the push-pull variation V from V=0.

In practice, this correlation between push-pull ratio R and push-pull variation V does exist, but an offset is present depending on, for example, the exact chemical composition of the phase-change layer of a rewritable optical disc. It means that there is a push-pull variation V≠0 if the push-pull ratio R=1. The gain factor K is then set to a value that optimizes the trade-off between push-pull ratio R and push-pull variation V. The gain factor K is set to a value for which |R−1| and |V| are as small as possible.

The optimum trade-off between push-pull ratio R and push-pull variation V is found in calculating the minimum of a merit function depending on |R−1| and |V|. For example, a first merit function F1 and a second merit function F2 are defined by:

$$F1(R, V) = |R-1| + |V| \quad \text{Eq. 7}$$

$$F2(R, V) = \sqrt{(R-1)^2 + V^2} \quad \text{Eq. 8}$$

Figures 3A, 3B:
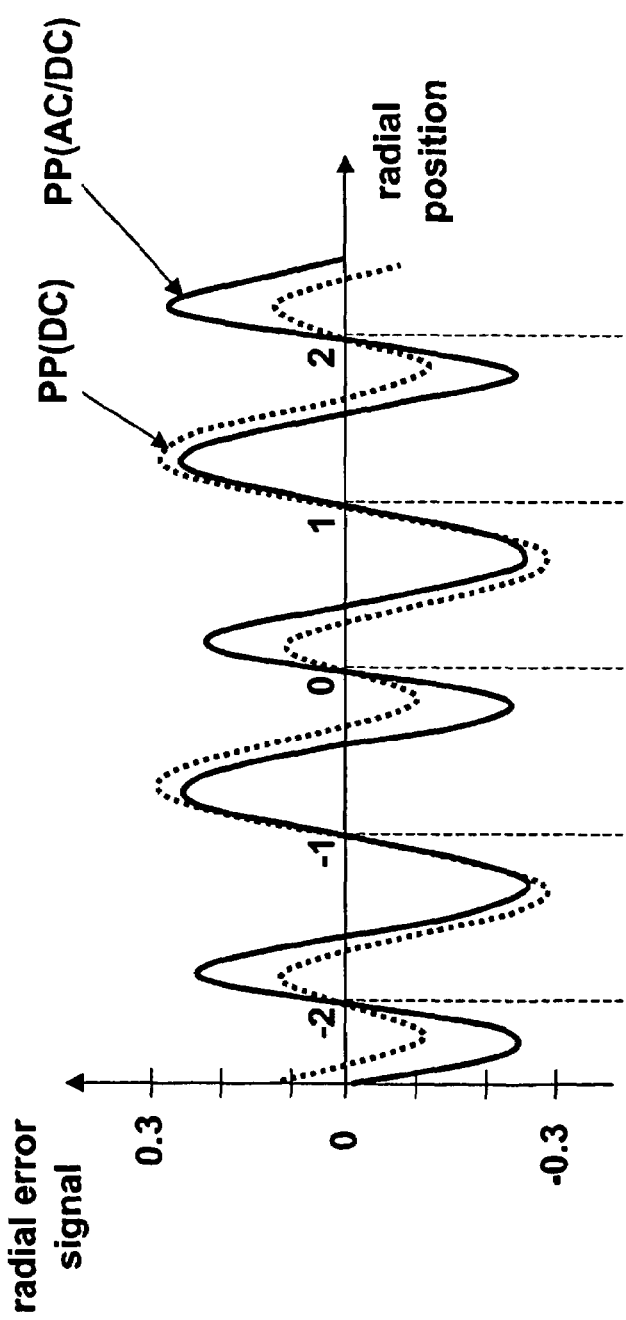
FIG. 3A shows a radial tracking error signal PP(AC/DC) generated by a tracking system according to the invention, and a radial tracking error signal PP(DC) generated by a tracking system according to the prior art method.
FIG. 3B shows the track structure and properties from which the radial tracking error signals shown in FIG. 3A have been generated.

FIG. 3A shows a radial tracking error signal PP(AC/DC) generated by a tracking system according to the invention (bold line), and a radial tracking error signal PP(DC) generated by a tracking system according to the prior art method (dotted line), as a function of the radial position of an optical disc.

The zero-crossings of these radial tracking error signals are used to identify the centers of tracks shown in FIG. 3B. The tracks are composed of alternating written tracks (grey color) and unwritten tracks (white color).

Unlike the PP(DC) signal that presents large variations and asymmetry, the PP(AC/DC) is very close to an ideal sine wave. As a consequence, the local offset and the slope at the zero-crossings are the same irrespective of whether the zero-crossings correspond to written or unwritten tracks.

The invention has been described with reference to the use of a photodetector having two detection areas A1 and A2. Of course, each area A1 and A2 may be composed of a plurality of elementary detection areas. In this case, considering the area A1 (or A2), the output signal A (and B) is generated by summation of the elementary output signals generated by the plurality of elementary detection areas.

The invention is not limited to the use of the merit functions F1 and F2 defined above, and other merit functions could be defined for finding an optimum trade-off between push-pull ratio R and push-pull variation V.

This tracking system according to the invention may be implemented by digital processing means (e.g. digital low-pass and high-pass filters, signal processors, memory devices), or alternatively by analog processing means (e.g. analog low-pass and high-pass filters).

The tracking system according to the invention is preferably implemented in an apparatus for reading and/or writing optical discs of the R type (Recordable: write-once, read-many) and of the RW type (ReWritable: write-many, read-many).

The invention claimed is:

1. Tracking system for guiding an optical beam on tracks on an information carrier, said tracking system comprising a photodetector (A1, A2) for detecting optical beams derived from said optical beam, said photodetector generating a first output signal (A) and a second output signal (B), said tracking system comprising first processing means for generating a first differential signal (PP(DC)) corresponding to the low-frequency part of a difference between said first and second output signals, characterized in that said tracking system comprises second processing means for generating a tracking error signal (PP(AC/DC)) defined by the addition of said first differential signal (PP(DC)) to a second differential signal (PP'(AC)), said second differential signal corresponding to a fraction of the difference in amplitude of the high-frequency components of said first and second output signals.

2. Tracking system as claimed in claim 1 comprising adjusting means for adjusting the value of said fraction to a value which minimizes a merit function (F1, F2), said merit function being a function of a first parameter (R) and a second parameter (V), said first parameter (R) corresponding to the ratio between the amplitude of said first differential signal (PP(DC)) in an area with only unwritten tracks and the amplitude of said first differential signal (PP(DC)) in an area with only written tracks, said second parameter (V) corresponding to the difference in amplitude of said first differential signal (PP(DC)) between two adjacent tracks of which one is written and the other is unwritten.

3. Apparatus for reading data on an optical disc, said apparatus comprising a tracking system as claimed in claim 1.

4. A method of tracking for guiding an optical beam on tracks on an optical disc, said method comprising a photodetection step for detecting optical beams derived from said optical beam, said photodetection step generating a first output signal (A) and a second output signal (B), said method comprising a first processing step for generating a first differential signal (PP(DC)) corresponding to the low-frequency part of a difference between said first and second output signals, characterized in that said method comprises a second processing step for generating a tracking error signal (PP(AC/DC)) defined by the addition of said first differential signal (PP(DC)) to a second differential signal (PP'(AC)), said second differential signal corresponding to a fraction of the difference in amplitude of the high-frequency components of said first and second output signals.

5. A method of tracking as claimed in claim 4 comprising an adjusting step for adjusting the value of said fraction to a value which minimizes a merit function (F1, F2), said merit function being a function of a first parameter (R) and a second parameter (V), said first parameter (R) corresponding to the ratio between the amplitude of said first differential signal (PP(DC)) in an area with only unwritten tracks and the amplitude of said first differential signal (PP(DC)) in an area with only written tracks, said second parameter (V) corresponding to the difference in amplitude of said first differential signal (PP(DC)) between two adjacent tracks of which one is written and the other is unwritten.

6. Apparatus for writing data on an optical disc, said apparatus comprising a tracking system as claimed in claim 1.

* * * * *